United States Patent [19]

Shin

[11] Patent Number: 5,870,463
[45] Date of Patent: Feb. 9, 1999

[54] ANSWERING TELEPHONE USING THREE-PARTY CALL SERVICE

[75] Inventor: Jae-Gwan Shin, Daegukwangyeok, Rep. of Korea

[73] Assignee: SamSung Electronics Co., Ltd., Suwon, Rep. of Korea

[21] Appl. No.: 655,124

[22] Filed: May 28, 1996

[30] Foreign Application Priority Data

May 25, 1995 [KR] Rep. of Korea .................. 13281/1995

[51] Int. Cl.⁶ ............................ H04M 1/64; H04M 3/44
[52] U.S. Cl. ........................... 379/212; 379/67; 379/214
[58] Field of Search .................................... 379/212, 211, 379/210, 67, 88, 77, 199, 196, 197, 372, 214, 201, 202, 355, 386, 387

[56] References Cited

U.S. PATENT DOCUMENTS

| | | | |
|---|---|---|---|
| 4,737,982 | 4/1988 | Boratgis et al. | 379/202 |
| 4,893,335 | 1/1990 | Fuller et al. | 379/200 |
| 4,926,461 | 5/1990 | Kuok | 379/67 |
| 5,029,196 | 7/1991 | Morgenstein | 379/67 |
| 5,168,517 | 12/1992 | Waldrman | 379/67 |
| 5,274,700 | 12/1993 | Gechter et al. | 379/210 |
| 5,289,528 | 2/1994 | Ueno et al. | 379/67 |
| 5,309,512 | 5/1994 | Blackmon et al. | 379/210 |
| 5,329,578 | 7/1994 | Brennan et al. | 379/67 |
| 5,361,295 | 11/1994 | Solomon et al. | 379/67 |
| 5,375,161 | 12/1994 | Fuller at al. | 379/88 X |
| 5,422,942 | 6/1995 | Kakwashima | 379/212 |
| 5,434,906 | 7/1995 | Robinson et al. | 379/67 |
| 5,436,962 | 7/1995 | Hirata | 379/212 |
| 5,452,349 | 9/1995 | Uehara et al. | 379/211 |
| 5,502,762 | 3/1996 | Andrew et al. | 379/202 |
| 5,511,111 | 4/1996 | Serbetcioglu et al. | 379/67 |

*Primary Examiner*—Scott L. Weaver
*Attorney, Agent, or Firm*—Robert E. Bushnell, Esq.

[57] ABSTRACT

A method and apparatus for directly connecting an incoming telephone call to a user's telephone located at an external location when the user is not present with an automatic answering telephone connected to a telephone line having three-party call service the apparatus effects the steps of: transmitting an information message for enabling a caller to select an automatic connection mode to the external and, after transmitting the information message in the information transmission step, when an automatic connection mode selection key has been inputted by the caller, holding the line during a preset time and reading and dialing the telephone number of the external location. When a speech path is formed by detection of a ringback tone after performance of the dialing, transmitting an information message requesting the user to input the selection key for receiving the call; and after transmitting the information message in the selection key input information message transmission step and, when the selection key for receiving call is inputted, executing the connection of the caller to the user telephone, thereby enabling a conversation by telephone.

11 Claims, 3 Drawing Sheets

ANSWERING TELEPHONE USING THREE-PARTY CALL SERVICE

CLAIM OF PRIORITY

This application make reference to, incorporates the same herein, and claims all benefits accruing under 35 U.S.C. §119 from an application entitled *Method for Automatically Connecting Incoming Signal To Outgoing Place In Automatic Answering Telephone Where Three-Party Call Service Is Subscribed* earlier filed in the Korean Industrial Property Office on 25 May 1995 and assigned Ser. No. 13281/1995.

BACKGROUND OF THE INVENTION

The present invention relates to an automatic answering telephone connected to a telephone line having a three-party call service. More particularly, the present invention relates to a method for automatically connecting an incoming telephone call, when a user (i.e., a called party) is not present, to a telephone located at his/her external location so that the user can selectively answer the incoming call.

In accordance with a three-party call service typically provided from a telephone office, when an incoming call from a third party wishing to converse with a first party already engaged in a conversation with a second party is provided to the first party, a switch-hook flash temporarily holds the second party while the subscriber's connection is switched to the third party, thereby enabling the first party to converse with the third party. Further, during the conversation with the third party, if the first party releases the switch-hook flash condition, the first party can again converse with the second party.

On the other hand, even though the first party has already been engaged in a conversation with the second party, if the first party wishes to converse with the third party, this is possible by effecting the switch-hook flash condition for a moment. Then, after the completion of the conversation with the third party, the first party can again converse with the second party.

When a call comes in during the user's absence, the conventional automatic answering telephone asks the calling party to leave his/her telephone number and other pertinent information, or sends the information left by the calling party to another telephone number preset by the user.

However, according to the conventional automatic answering telephone, there may arise a problem in that it is difficult to smoothly connect the calling party to the user when the calling party is desirous to directly converse with the user who is not present at the location of the telephone called by the calling party.

Solomon et al., U.S. Pat. No. 5,361,295, is related to the present invention in that it has several elements in common with the present invention.

Namely, Solomon et al. discloses an anonymous interactive telephone system for connecting a caller to a user. As noted in FIG. 5 of Solomon et al., when a caller calls a predetermined telephone number, the call may either be immediately forwarded to a user at a different number or a message is played to the caller asking the caller if a message is to be recorded and if not, the caller is asked whether they wish to be connected to the user.

If the caller wishes to be connected to the user, the user is called and the call is transferred to the user.

Not that the subscriber in Solomon et al. is not given the option of selecting whether or not he or she wishes to receive a particular call from the caller. The only option to the user is whether or not they wish to not receive calls during preselected period of time.

In an alternative embodiment of Solomon et al, the caller first records a message which is then played back to the user. The user can then decide whether or not he or she wishes to be connected to the caller.

On the other hand, in the present invention, a inquiry is always immediately made to the user after a call is detected to determine if the user wishes to receive a call from the caller. There is no recording of a caller's message nor is there a playback of the recorded message to the user after a call has been detected.

Furthermore, the caller is asked if he or she wishes to receive the telephone number of the telephone located at the user's external location, thereby precluding and eliminating the anonymity of the user's telephone number at the external location, as required by Solomon et al.

SUMMARY OF THE INVENTION

It is therefore, an object of the invention to provide a method and apparatus for directly connecting an incoming telephone call to a telephone located at a user's external location when the user is not present with an automatic answering telephone connected to a telephone line having a three-party call service.

The above noted objects may be effected by providing a method of automatically connecting an incoming telephone call to a user's telephone located at an external location with an automatically answering telephone connected to a telephone line having three-party call service including the steps of: detecting an incoming telephone call by a caller; transmitting an information message to the caller requesting the caller to select an automatic connection mode for connecting the caller to the user's telephone located at an external location after the incoming telephone call has been detected, and then detecting the selection of the automatic connection mode by the caller and, in response thereto, immediately holding the line of the caller while reading and dialing the previously stored telephone number of the user's telephone located at an external location; detecting a ringback tone after dialing the user's telephone located at an external location and then transmitting an information message to the user requesting the user to indicate if the caller is to be connected to the user, and then detecting the indication by the user that the caller is to be connected to the user and then connecting the caller to the user.

The above noted object may also be effected by providing an apparatus for automatically connecting an incoming telephone call to a user's telephone located at an external location with an automatic answering telephone connected to a telephone line having three-party call service including: a first detector for detecting an incoming telephone call by a caller and an information message transmitter for transmitting an information message to the caller requesting the caller to select an automatic connection mode for connecting the caller to the user's telephone located at an external location after the incoming telephone call has been detected; a second detector for detecting the selection of the automatic connection mode by the caller and a means for immediately holding the line of the caller while reading and dialing a previously selected telephone number of the user's telephone located at an external location in response to the detection of the selection and a third detector for detecting a ring back tone after dialing the user's telephone located at an external location and a second information message transmitter for transmitting an information message to the user requesting the user to indicate if the caller is to be connected to the user; and a fourth detector for detecting the indication by the user that the caller is to be connected to the user and then connecting the caller to the user.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENT

Figure 1:
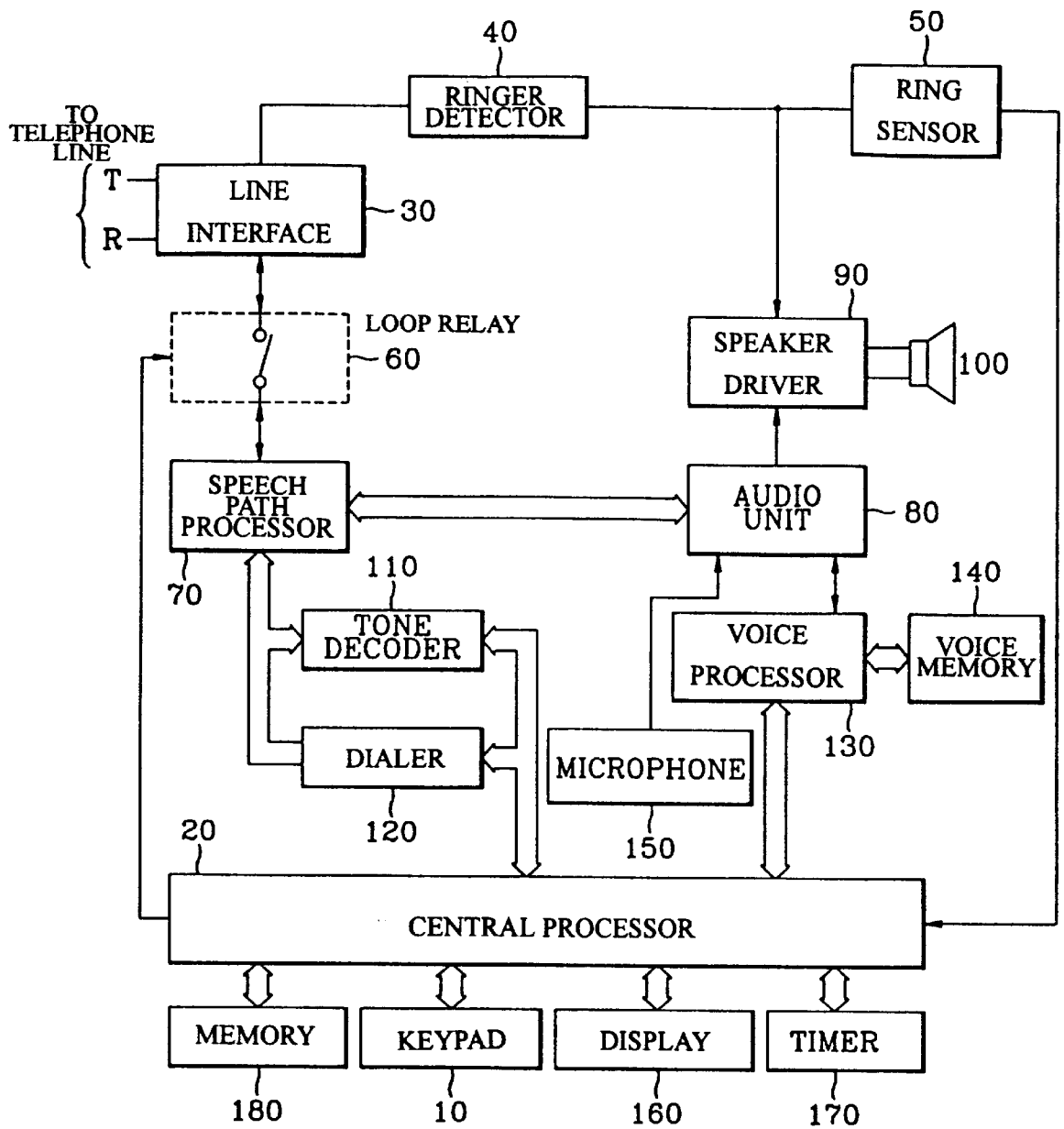
FIG. 1 is a block diagram of an automatic answering telephone implemented according to the present invention.

FIG. 1 is a block diagram of an automatic answering telephone implemented according to the present invention. In FIG. 1, keypad 10 generates key commands and key data to control the operations of the telephone. A central processor 20 receives outputs from the keypad 10 and controls the overall operation of the telephone. A line interface 30 interfaces ring signals, tone signals, and call voice signals with the telephone, the line interface being connected to a public telephone network through the telephone line. A ringer detector 40 whose input is connected to the line interface 30 detects the ring signal received by the line interface 30. A ring sensor 50 is connected to the ringer detector 40 and outputs a ring sensing signal to the central processor 20 when the ring signal is received. A loop relay 60 is connected to the line interface 30 to form a voice speech path between the telephone and the public telephone network. A speech path processor 70 is connected to the loop relay 60 to process a voice signal and a tone signal during hook off operation. An audio unit 80 is connected to the speech path processor 70 to receive the voice signal from the public telephone network, or to receive a sound message to be processed. A speaker driver 90 receives outputs of the ringer detector 40 and the audio unit 80 and generates an audible sound by driving a speaker 100.

A voice memory 140 records an information message as digital data. A voice processor 130 processes the information message stored in the voice memory 140 and outputs the processed message to the audio unit 80 under control of the central processor 20. In addition, the voice processor 130 converts the message received from the audio unit 80 into digital data which is then stored in the voice memory 140. A microphone 150 outputs a voice signal generated from a subscriber to the audio unit 80. A tone decoder 110 decodes a DTMF signal received by the speech path processor 70 and converts the signal into digital form and then outputs it to the central processor 20. A dialer 120 converts a telephone number outputted from the central processor 20 into a DTMF signal and then outputs the signal to the speech path processor 70. A display 160 displays the state of the system under the control of the central processor 20.

Figure 2A:
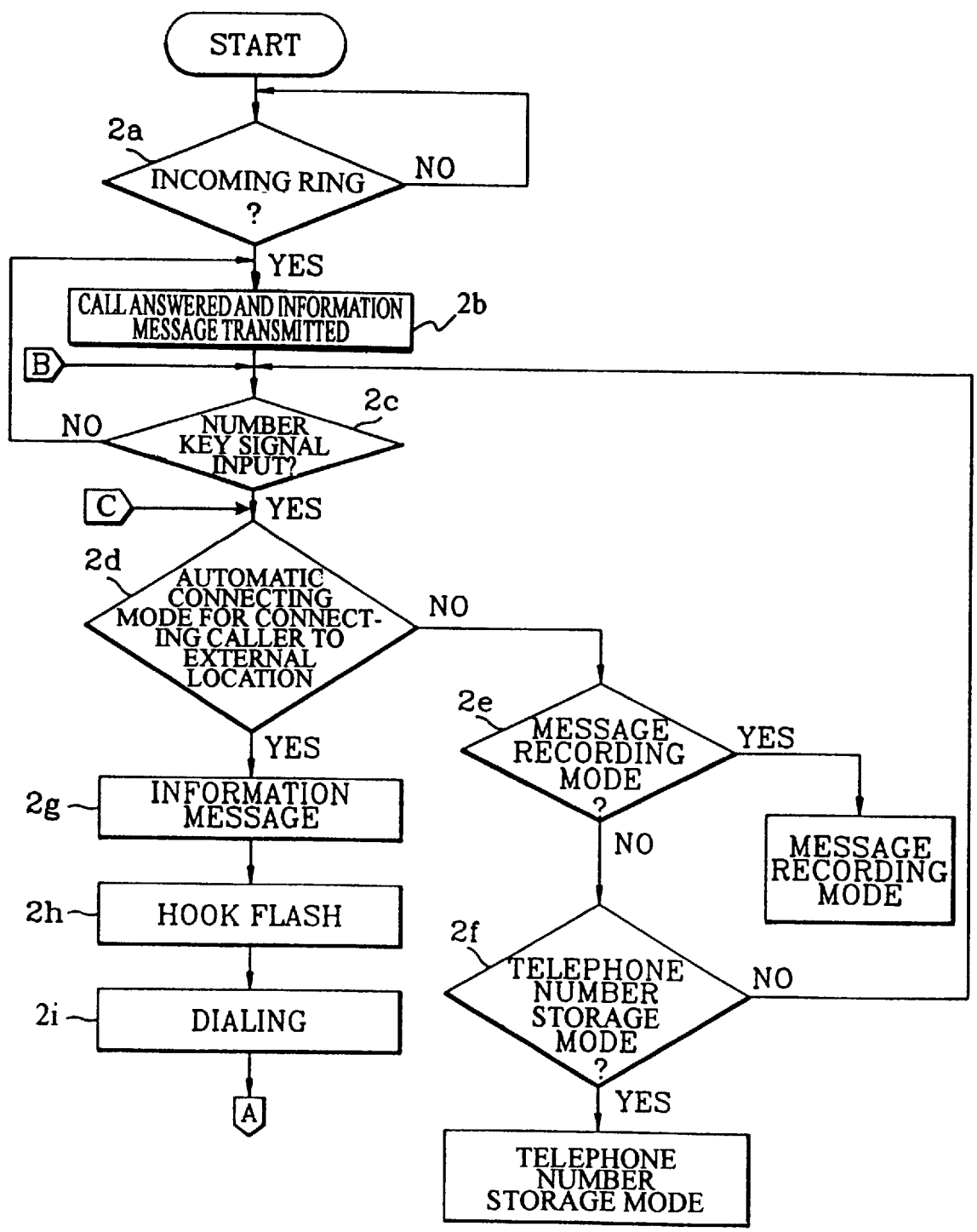
FIGS. 2A and 2B together form a flowchart illustrating an automatic call connection to a user's telephone located at an external location according to an embodiment of the present invention.
Figure 2B:
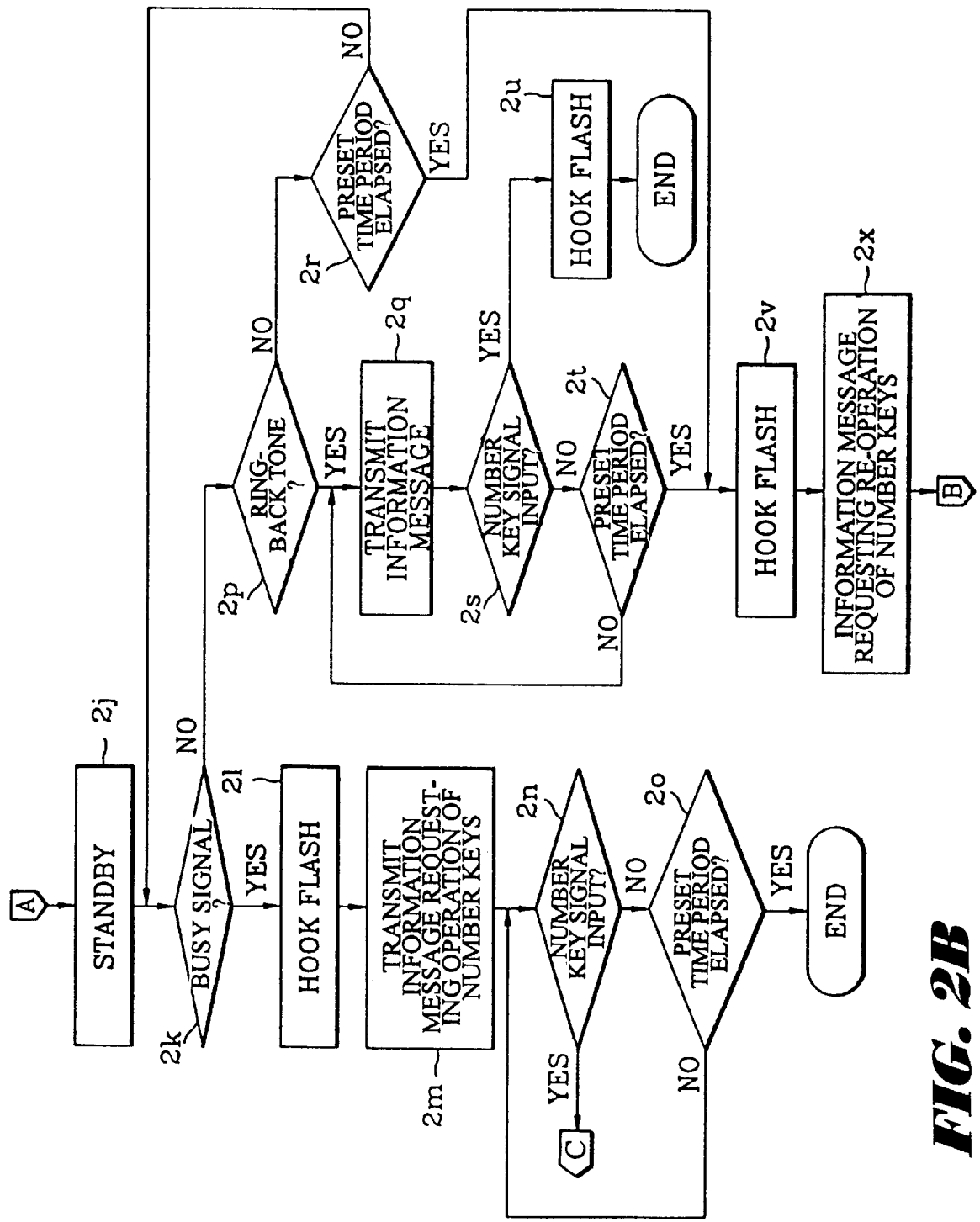

FIGS. 2A and 2B together form a flowchart illustrating an automatic call connection to a user's telephone located at an external location when the user is not present at the location of the telephone called by the calling party according to an embodiment of the present invention. In FIG. 2A, when a call comes in during the user's absence, at step 2a the central processor 20 detects an incoming ring signal. When the ring signal is detected, the call is answered and the central processor 20 outputs, at step 2b, the information message.

The information message invites the calling party to select any one of a number of functions such as an automatic connection to the user's external location, a telephone number storage function, and a message record function. That is, the information message may be "Your party is presently unavailable. Therefore, please press the number key corresponding to the desired function. Namely, press 1 if you want to record a message, press 2 if you want to leave your telephone number, and press 3 if you want to be connected to your party's telephone at an external location."

Thereafter, the central processor 20 determines, at step 2c, whether or not a number key signal, corresponding to a number key being pressed by a caller, has been inputted. If there is no number key signal inputted, the operation returns to step 2b, and the information message is again transmitted. However, if a number key signal has been inputted, the central processor 20 of the automatic answering telephone controls the corresponding functions so that they can be performed.

The automatic answering device then operates in accordance with any one of the selected modes such as a message recording mode, a telephone number storage mode, and an automatic connecting mode for connecting the caller to the user's external location. Both the message recording mode and the telephone number storage mode have already been included in conventional automatic answering telephones. At step 2d, the central processor 20 determines whether the selected number key signal corresponds to the automatic connecting mode for connecting the caller to the user's external location. If the automatic connecting mode has been selected, the central processor 20 drives, at step 2g, the voice processor 130 and sends an information message to inform the calling party that his/her call will be transferred to the user's external location. When the transmission of the information message is completed, the operation proceeds to step 2h. At step 2h, the central processor 20 controls a hook switch of the telephone and causes a hook flash condition. Then, it proceeds to step 2i. At step 2i, the central processor 20 dials the telephone number of the external location which has been previously stored in the memory unit 180 by the user.

After completion of the dialing at step 2i of FIG. 2A, at step 2j the central processor 20 effects a standby waiting time for allowing the connection to the telephone located at the external location. Thereafter, at step 2k, the central processor 20 determines whether or not a busy signal has been detected in the telephone line during a given waiting time. If the busy signal has been detected, this means that the telephone line at the external location is busy. Therefore, at step 2l the hook flash condition is effected. After the hook flash at step 2l, at step 2m the central processor 20 controls the voice processor 130 and thereby informs the caller that the line at the external location is busy. Furthermore, when the calling party wishes to directly converse with the user by telephone, the central processing unit verbally transmits an information message such as a stored telephone number of the user's external location. Furthermore, when the calling party wishes to leave a message or a telephone number in the automatic answering telephone, as mentioned at above step 2b, an information message such as "please dial XXX-XXXX if you want to be directly connected to the user, or please press 2 if you want to leave a message" is transmitted.

After the completion of the transmission of the information message, at step 2n, the central processor 20 determines whether or not a number key signal has been inputted through the telephone line. If such a number key signal has been inputted, the operation returns to step 2c and the above operations are repeatedly performed. On the other hand, if there is no number key signal has been inputted, the operation proceeds to step 2o. At step 2o, the central processor 20 determines if a preset period of time has elapsed. If the preset period of time has elapsed, the telephone conversation is ended by placing the telephone in an on-hook condition. On the other hand, if the preset period of time has not yet elapsed, the central processor 20 waits for the re-input of the number key signal.

However, alternatively, at step 2k, a determination is made as to whether or not the busy signal has been inputted due to the dialing to the external location by the automatic answering telephone, and if there is no busy signal, the operation proceeds to step 2p. At step 2p, the central processor 20 checks whether or not a ringback tone signal has been inputted. If the checked signal is not the ringback tone signal, the operation proceeds to step 2r. At step 2r the central processor 20 determines whether or not the preset time period has elapsed. If the preset time period has not yet elapsed, at step 2k the central processor 20 checks again for a busy signal.

However, if the signal checked at step 2p is the ringback tone signal, it can be assumed that the ring is being transmitted to the external location, so that at step 2q, the information message is sent.

This information message only informs the user who is at the external location that a call has come in, and if the user wishes to converse with the calling party, an information message is transmitted to request the user to input a specific number key. Together with the transmission of the information message, the central processor 20, at step 2s, checks repeatedly whether or not the number key signal has been inputted by the user.

Since it is impossible to know whether or not the user who is at the external location has already answered the call, the presence or absence of the numeric key input is concurrently checked with the transmission of the information message.

If it is sensed that the number key signal has been inputted by the user from the external location during the transmission of the information message, at step 2u, the hook flash condition is effected, so that the first calling party can converses with the user and the automatic answering telephone ends its operation.

Accordingly, the above steps of automatically connecting the calling party to the user's external location outgoing place are completed by the end of the above operation. By the way, if no number key signal from the user is detected at step 2s, the operation proceeds to step 2t. At step 2t, the central processor 20 determines whether or not a preset time period has elapsed. If the preset time period has not elapsed, the operation returns to step 2q and the above noted operations are repeatedly performed.

However, if the preset time period has elapsed, at step 2v, the hook flash condition is effected. Then, the operation proceeds to step 2x. At step 2x, the central processor 20 transmits the information message informing the caller that there is no answer at the external location and requesting the reoperation of the number keys.

After the completion of the transmission of the information message, the operation returns to step 2c where the central processor 20 determines whether or not the number key signal has been inputted, and thereby performs repeatedly the following same steps.

As mentioned above, the present invention transmits the information message in the automatic answering telephone when a call comes in during the user's absence. In addition, the present invention enables a calling party to select an automatic connecting mode for connecting the caller to the user's external location, and then performs the dialing to the user's external location, so that the calling party can converse at the user with a telephone which is at the external location. This makes it is possible for the calling party to conveniently converse with the user, even if the user is not present at the location of the called telephone.

What is claimed is:

1. A method of automatically connecting an incoming telephone call to a user's telephone located at an external location with an automatic answering telephone connected to a telephone line having three-party call service, comprising the steps of:

a) detecting the incoming telephone call from a caller;
   b) transmitting an information message to the caller requesting the caller to select, as one of a plurality of options, an automatic connection mode for connecting the incoming telephone call to the user's telephone located at an external location after the incoming telephone call is detected;
   c) detecting the selection of the automatic connection mode by the caller and in response thereto, immediately holding the incoming telephone call while reading and dialing a previously stored telephone number of the user's telephone located at an external location;
   d) detecting a ringback tone after dialing the user's telephone located at an external location and then transmitting an information message to the user requesting the user to indicate if the incoming telephone call is to be connected to the user's telephone; and
   e) detecting the indication by the user that the caller is to be connected to the user and then connecting the caller to the user's telephone.

2. A method as recited in claim 1, wherein the mode is selected by the caller, and the user indicates that the incoming telephone call is to be connected to the user's telephone by respectively pressing predetermined number keys.

3. A method of automatically connecting an incoming telephone call to a user's telephone located at an external location with an automatic answering telephone connected to a telephone line having three-party call service, comprising the steps of:

a) detecting the incoming telephone call from a caller;
   b) transmitting an information message to the caller requesting the caller to select, as one of a plurality of options an automatic connection mode for connecting the incoming telephone call to the user's telephone located at an external location after the incoming telephone call is detected;
   c) detecting the selection of the automatic connection mode by the caller and in response thereto, immediately holding the incoming telephone call while reading and dialing a previously stored telephone number of the user's telephone located at an external location;
   d) upon detecting a busy signal after dialing the telephone number of the user's telephone located at an external location and then transmitting an information message to the call requesting the caller to select one of:
      1) a request for the telephone number of the user's telephone located at an external location, or
      2) storing a recorded message of the caller, or 3) storing the telephone number of the caller for the user, e) detecting a ringback tone after dialing the user's telephone located at an external location and then transmitting an information message to the user requesting the user to indicate if the incoming telephone call is to be connected to the user's telephone; and f) detecting the indication by the user that the incoming telephone call is to be connected to the user's telephone and then connecting the incoming telephone call to the user's telephone.

4. A method as recited in claim 3, wherein the selection by the caller is effected by pressing a predetermined number key.

5. A method of automatically connecting an incoming telephone call to a user's telephone located at an external location with an automatic answering telephone connected to a telephone line having three-party call service, comprising the steps of:

a) detecting the incoming telephone call from a caller;

b) transmitting an information message to the caller requesting the caller to select an automatic connection mode for connecting the incoming telephone call to the user's telephone located at an external location after the incoming telephone call is detected or requesting the caller to select a message recording mode for recording a message by the caller for the user or requesting the caller to select a telephone number storage mode for storing the telephone number of the caller for the user;

c) recording a message from the caller to the user upon detecting the selection of the message recording mode or storing the telephone number of the caller upon detecting the selection of the telephone number storage mode;

d) immediately holding the incoming telephone call while reading and dialing a previously stored telephone number of the user's telephone located at an external location upon detecting the selection of the automatic connection mode by the caller;

e) detecting a ringback tone after dialing the user's telephone located at an external location and then transmitting an information message to the user requesting the user to indicate if the incoming telephone call is to be connected to the user's telephone; and f) detecting the indication by the user that the incoming telephone call is to be connected to the user's telephone and then connecting the incoming telephone call to the user's telephone.

6. A method as recited in claim 5, wherein the selection by the caller is effected by pressing a predetermined number key.

7. An apparatus for automatically connecting an incoming telephone call to a user's telephone at an external location with an automatic answering telephone connected to a telephone line having three-party call service, comprising:

a) a first detector for detecting the incoming telephone call from a caller;

b) an information message transmitter for transmitting an information message to the caller requesting the incoming telephone call to select, as one of a plurality of options, an automatic connection mode for connecting the caller to the user's telephone located at an external location after the incoming telephone call is detected;

c) a second detector for detecting the selection of the automatic connection mode by the caller and a means for holding the incoming telephone call while immediately reading and dialing a previously stored telephone number of the user's telephone located at an external location in response to the detection of the selection by the caller;

d) said first detector detecting a ringback tone after dialing the user's telephone located at an external location and said information message transmitter then transmitting an information message for the user requesting the user to indicate if the incoming telephone call is to be connected to the user's telephone; and e) said second detector detecting the indication by the user that the incoming telephone call is to be connected to the user's telephone and then connecting the incoming telephone call to the user's telephone.

8. An apparatus as recited in claim 7, further comprising a dual tone multifrequency keypad disposed at the caller's location, the automatic connection mode being selected by the caller by pressing a predetermined key on said dual tone multifrequency keypad.

9. An apparatus as recited in claim 7, further comprising a dual tone multifrequency keypad disposed at the user's telephone, the user indicating that the incoming telephone call is to be connected to the user's telephone by pressing a predetermined key on said dual tone multifrequency keypad.

10. An apparatus for automatically connecting an incoming telephone call to a user's telephone located at an external location with an automatic answering telephone connected to a telephone line having three-party call service, comprising:

a) a first detector for detecting the incoming telephone call from a caller;

b) an information message transmitter for transmitting an information message to the caller requesting the caller to select, as one of a plurality of options, an automatic connection mode for connecting the incoming telephone call to the user's telephone located at an external location after the incoming telephone call is detected;

c) a second detector for detecting the selection of the automatic connection mode by the caller and a means for holding the incoming telephone call while immediately reading and dialing a previously stored telephone number of the user's telephone located at an external location in response to the detection of the selection by the caller;

d) said second detector for detecting a ringback tone after dialing the user's telephone located at an external location and said information message transmitter then transmitting an information message for the user requesting the user to indicate if the incoming telephone call is to be connected to the user's telephone; and e) said second detector for detecting the indication by the user that the incoming telephone call is to be connected to the user and then connecting the incoming telephone call to the user's telephone; and f) said first detector for detecting a busy signal after dialing the user's telephone located at an external location and said information message transmitter then transmitting an information message to the caller requesting the caller to select one of:

1) a request for the telephone number of the user's telephone located at an external location; or 2) storing a recorded message by the caller, or 3) storing the telephone number of the caller for the user.

11. An apparatus for automatically connecting an incoming telephone call to a user's telephone located at an external location with an automatic answering telephone connected to a telephone line having three-party call service, comprising:

a) a first detector for detecting the incoming telephone call from a caller;

b) an information message transmitter for transmitting an information message to the incoming telephone call requesting the caller to select an automatic connection mode for connecting the caller to the user's telephone located at an external location after the incoming telephone call is detected or requesting the caller to select a message recording mode for recording a message by the caller for the user or requesting the caller to select a telephone number storage mode for storing the telephone number of the caller for the user;

and further comprising a means for detecting one of either the selection of the message recording mode and then recording a message from the caller to the user or the selection of the telephone number storage mode and then storing the telephone number of the caller;

c) a second detector for detecting the selection of the automatic connection mode by the caller and a means for holding the incoming telephone call while immediately reading and dialing a previously stored telephone number of the user's telephone located at an external location in response to the detection of the selection by the caller;

d) said second detector detecting a ringback tone after dialing the user's telephone located at an external location and said information message transmitter then transmitting an information message for the user requesting the user to indicate if the incoming telephone call is to be connected to the user's telephone; and e) said second detector detecting the indication by the user that the incoming telephone call is to be connected to the user and then connecting the incoming telephone call to the user's telephone.

\* \* \* \* \*